United States Patent [19]
Suissa et al.

[11] Patent Number: 5,557,520
[45] Date of Patent: Sep. 17, 1996

[54] METHOD FOR DETERMINING VARIABLES CHARACTERIZING VEHICLE HANDLING

[75] Inventors: Avshalom Suissa, Leonberg; Zoltan Zomotor, Waiblingen; Friedrich Boettiger, Stuttgart, all of Germany

[73] Assignee: Daimler-Benz AG, Stuttgart, Germany

[21] Appl. No.: 283,297

[22] Filed: Jul. 29, 1994

[30] Foreign Application Priority Data

Jul. 29, 1993 [DE] Germany ............... 43 25 413.6

[51] Int. Cl.$^6$ ..................... G06F 19/00
[52] U.S. Cl. ............ 364/424.01; 364/426.01; 364/424.05
[58] Field of Search ............ 364/424.01, 426.01, 364/424.05, 434

[56] References Cited

U.S. PATENT DOCUMENTS

| | | | |
|---|---|---|---|
| 4,679,808 | 7/1987 | Ito et al. | 280/91 |
| 4,767,588 | 8/1988 | Ito | 364/424.05 |
| 5,105,899 | 4/1992 | Mori et al. | 180/140 |
| 5,311,431 | 5/1994 | Cao et al. | 364/424.05 |
| 5,386,365 | 1/1995 | Nagaoka et al. | 364/424.05 |

FOREIGN PATENT DOCUMENTS

| | | |
|---|---|---|
| 4031304 | 4/1992 | Germany. |
| 4200061 | 7/1993 | Germany. |

OTHER PUBLICATIONS

*Vogel–Fachbuch Technik Kraftfahrzeugwesen* entitled "Fahrwerktechnik: Fahrverhalten (Chassis Technology: Vehicle Handling)" by Adam Zomotor, Vogel Buchverlag Würzburg 1987.

"Dynamik–der Kraftfahrzeuge" (Motor Vehicle Dynamics) by M. Mitschke, Springer Verlag Berlin, 2nd Edition 1990.

*Primary Examiner*—Michael Zanelli
*Attorney, Agent, or Firm*—Evenson, McKeown, Edwards & lenahan, P.L.L.C.

[57] ABSTRACT

A method for determining variables characterizing vehicle handling is provided, in particular the attitude angle. Signals of measured variables are fed to a computing device. At least the attitude angle is determined in the computing device using equations of motion and using a two-track model of the vehicle.

10 Claims, 1 Drawing Sheet

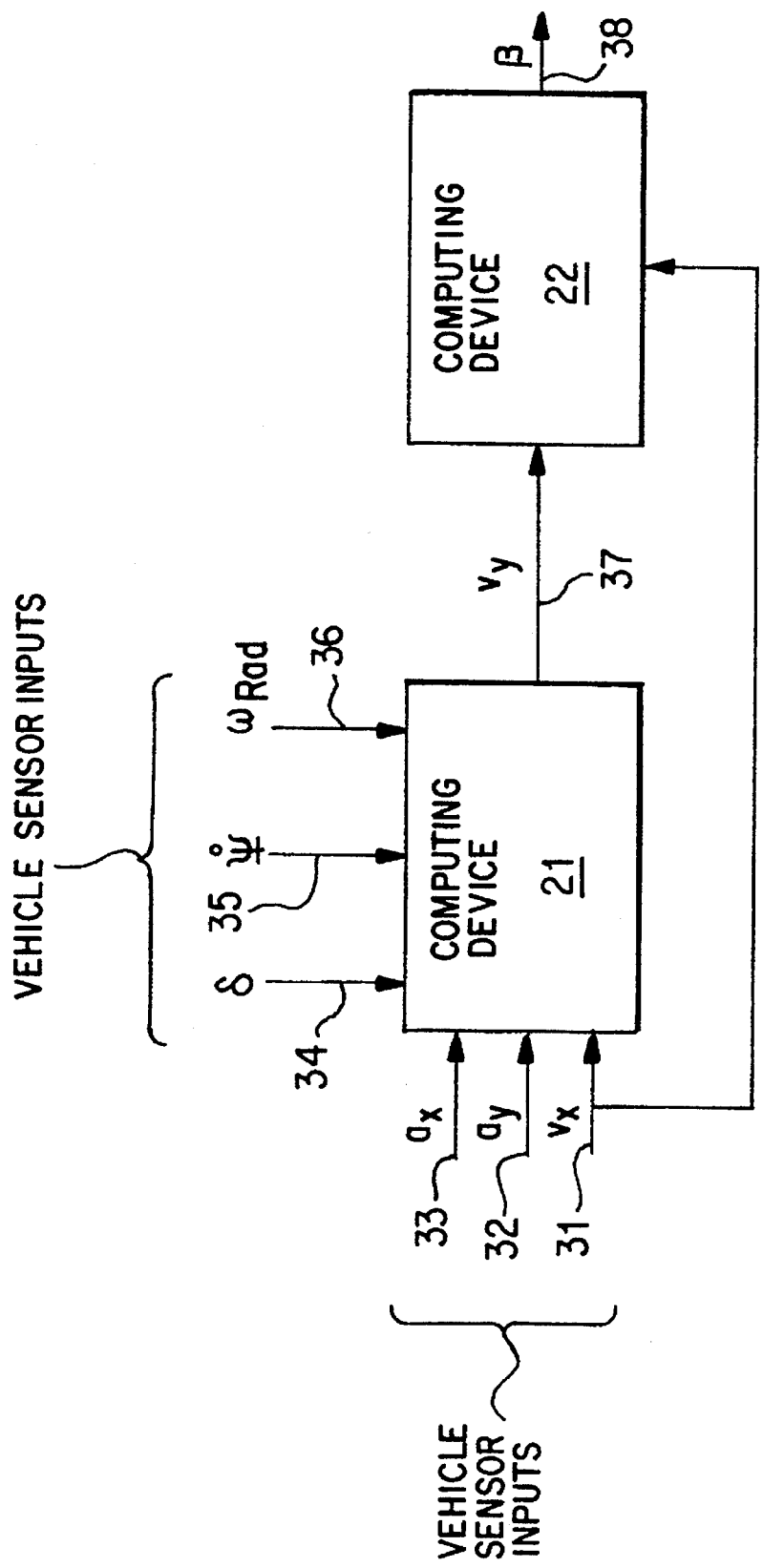

METHOD FOR DETERMINING VARIABLES CHARACTERIZING VEHICLE HANDLING

BACKGROUND AND SUMMARY OF THE INVENTION

The invention relates to a method for determining variables characterizing vehicle handling. A computing device is fed signals representing the following measured variables: the vehicle longitudinal velocity ($v_x$); the vehicle longitudinal acceleration ($a_x$); the vehicle lateral acceleration ($a_y$); and the vehicle yaw velocity ($\dot\Psi$). Motion equations are used in the computing device to determine the variables characterizing the vehicle handling, including a side slip angle ($\beta$).

The known method does not take into account driving conditions such as occur in the case of an inclined roadway. These can be both roadway inclinations in the longitudinal direction, that is to say gradients, and roadway inclinations in lateral directions, such as occur in bends, for example. A systematic error occurring in those cases is accepted.

By contrast, it is known from German Patent document DE 36 08 420 C2 to determine the side slip angle on the basis of measured variables with the aid of a vehicle model and on the basis of vehicle parameters. The steering wheel angle, the vehicle speed, two lateral acceleration values and the yaw velocity are required as measured variables. By means of the vehicle parameters, the side slip angle is determined with the aid of the relationships based on the vehicle model. Moreover, the values of the parameters are matched to the measured variables in a control loop.

This method likewise permits the calculation of the side slip angle only when the vehicle moves in a plane, without any body movements, such as pitching and rolling occurring. Furthermore, this method requires characteristics of the tires, which have to be stored and whose values must be continuously correctable.

A further method, which determines the side slip angle on the basis of the measured values of steering angle, vehicle velocity, yaw velocity and wheel speeds, as well as a value of lateral acceleration which is estimated using a measured value of the lateral acceleration, follows from German Patent document DE 42 00 061 A1. In this case, one of the two equations of motion is used for the motion of a body in the plane and is numerically integrated in order to determine the lateral velocity. This method, too, considers only the motion of the vehicle in the plane. A systematic error arises in the case of roadways having a lateral inclination.

It is the object of the present invention to develop the basic method as described above wherein the determination of variables characterizing vehicle handling can be performed in all driving conditions.

According to the present invention, the object is achieved by a computing device which is fed signals representing the following measured variables: the vehicle longitudinal velocity ($v_x$); the vehicle longitudinal acceleration ($a_x$); the vehicle lateral acceleration ($a_y$); and the vehicle yaw velocity ($\dot\Psi$). Motion equations are used in the computing device to determine the variables characterizing the vehicle handling, including the side slip angle ($\beta$). In addition, at least further signals representing the measured variables of the steering angle ($\delta$) and the wheel speed ($\omega$) of the individual wheels are fed to the computing device. In addition to using the equations of motion for determining the variables characterizing vehicle handling, use is also made of at least one measurement equation based on a vehicle model. The inclination angel ($\Phi$) of the roadway with respect to the plane is used as a state variable for the measurement equation.

The present invention is based on supplementing the equations of motion by means of measurement equations based on a vehicle model. This requires the selection of a vehicle model which is matched to the equations of motion and permits the side slip angle to be calculated with further use of equations of motion.

The method proposed is based on the equations of motion $$\frac{d}{dt}\begin{bmatrix} v_x \\ v_y \end{bmatrix} = \begin{bmatrix} 0 & \dot\Psi \\ -\dot\Psi & 0 \end{bmatrix}\begin{bmatrix} v_x \\ v_y \end{bmatrix} + \begin{bmatrix} a_x \\ a_y \end{bmatrix} \quad (100)$$

of the vehicle in the plane. These equations of motion are, furthermore, the basis for calculating the variables characterizing vehicle handling.

The further measurement equations are based on a model which is based on the equilibrium of forces in the vehicle plane and an equilibrium of torque in the vertical direction of the vehicle. The following expressions apply for the measurable variables of the longitudinal acceleration $a_x$ and the lateral acceleration $a_y$:

$$a_x = \frac{[-(S_{vl}+S_{vr})\sin\delta + (U_{vl}+U_{vr})\cos\delta + U_{hl} + U_{hr}]}{m} + \Delta x \quad (101,102)$$

$$a_y = \frac{[-(S_{vl}+S_{vr})\cos\delta + (U_{vl}+U_{vr})\sin\delta + S_{hl} + S_{hr}]}{m} + \Delta y$$

while the relationship:

$$\ddot\Psi = \frac{\{(S_{vl}-S_{vr})S_v + (U_{vl}+U_{vr})l_v\}\sin\delta}{J_z} + \quad (103)$$

$$\frac{\{(S_{vl}+S_{vr})l_v - (U_{vl}-U_{vr})S_v\}\cos\delta}{J_z} - \frac{(S_{hl}+S_{hr})l_h}{J_z}$$

$$\frac{(U_{hl}-U_{hr})S_h}{J_z} + \Delta\Psi$$

holds in the vertical direction for the yaw acceleration $\ddot\Psi$, if $J_z$ denotes the moment of inertia of the vehicle above the vertical axis and $1_{v,h}$ respectively denote the distance of the front and rear axles from the vehicle center of gravity. The indices v,h always stand for front and rear, respectively, in the vehicle longitudinal direction, and the indices l,r for left and right, respectively. The terms $\Delta x$, $\Delta y$ and $\Delta\Psi$ contain the terms, which are difficult to express, for wind forces, as well as other disturbances such as engine torques, for example. Moreover, $\Delta x$ contains a term $g*\sin\Phi$, and $\Delta y$ contains a term $-g*\sin\Phi$, which respectively represent the support force for the vehicle. Thus, the lateral forces S and the longitudinal forces U, which act between the corresponding wheel and the roadway, essentially remain as unknown variables. A corresponding mathematical model describing the forces between the tires and the roadway can be found in the German book by A. Zomotor; Fahrwerktechnik: Fahrverhalten (Chassis Technology: Vehicle Handling): Vogel-Fachbuch Technik; Würzburg 1987, which principally describes a single-track model of a vehicle. As a complement to this, a double-track four wheel model derived from a single-track model can be found in the German book by M. Mitschke; Dynamik-der Kraftfahrzeuge (Motor Vehicle Dynamics); Springer Verlag Berlin, 2nd edition 1990. The tire forces are calculated by:

$$U = \begin{cases} \dfrac{C_u \lambda_u}{(\xi_u - 1)^2 + C_u \xi_u}; \xi_u \leq 1 \\ \dfrac{\lambda_u}{\lambda_r} \mu_u F_z; \xi_u > 1 \end{cases} \quad (104)$$

$$S = \begin{cases} \dfrac{C_s \lambda_s}{(\xi_s - 1)^2 + C_s \xi_s}; \xi_s \leq 1 \\ \dfrac{\lambda_s}{\lambda_r} \mu_s F_z; \xi_u > 1 \end{cases} \quad (105)$$

$\lambda_{s,u}$ representing the slip in the lateral direction or in the longitudinal direction; $\lambda = \sqrt{\lambda_u^2 + \lambda_s^2}$ representing a standardized wheel slip, $C_{s,u}$ representing the slip stiffness; and $\mu_{s,u}$ representing the adhesion coefficient, if it is assumed that the adhesion coefficient is quasistationary, that is to say that the relationship $$\dot{\mu} = 0 \quad (106)$$

holds in the first order for the adhesion coefficient. For this purpose, the tire characteristic is approximated by the broken rational function:

$$\zeta = \begin{cases} \dfrac{C^* \xi}{(\xi - 1)^2 + C^* \xi}; \xi \leq 1 \\ 1; \xi > 1 \end{cases}$$

wherein $\zeta$ is the standardized characteristic over a standardized slip $\xi$.

Since the side slip angle follows from the relationship:

$$\beta = -\arctan \dfrac{v_y}{v_x}$$

the vehicle longitudinal velocity $v_x$ being a measured variable, the vehicle lateral velocity $v_y$ must be determined in order to calculate the side slip angle. For this purpose, the nonlinear differential equations of the model are represented in vectorial form $$\dot{\bar{x}} = f(\bar{x}, \bar{u}) \quad (108)$$

with the boundary conditions $t > 0$ and $\bar{x}(0) = x0$. An expression for the differential equations of the model is obtained using the equations (100) of motion and equations (101, 102), as well as using the equation (103). If the tire forces $\vec{U}$ and $\vec{S}$ are regarded as quasistationary, that is to say the partial derivative with respect to time is equal to zero, the model is described by the equations $$\underbrace{\begin{bmatrix} \dot{v}_y \\ \dot{v}_x \\ \dot{\mu} \end{bmatrix}}_{\dot{\bar{x}}_r} = \underbrace{\begin{bmatrix} \dot{\Psi} v_y + a_x(v_x, v_y, \dot{\Psi}, \delta, \bar{\omega}_{rad}) \\ -\dot{\Psi} v_x + a_y(v_x, v_y, \dot{\Psi} \delta, \bar{\omega}_{rad}) \\ 0 \end{bmatrix}}_{f_r(\bar{x}_r, \bar{u})} \quad (111)$$

Equation (111) has the following general representation of state space $$\dfrac{d\bar{x}}{dt} = \underline{A}(t)\bar{x} + \bar{w}(t) \quad (112)$$

It holds in this case for the associated measurement equation that:

$$\bar{y} = [y_1 \ y_2 \ y_3] = [v_x \ \alpha_y(\bar{x}, \bar{u}) \ \alpha_x(\bar{x}, \bar{u})]^t \text{ with } \bar{u} = [\dot{\Psi} \omega_{rad}{}^i \delta]^t \quad (113)$$

In the case of the present model, the equation $$\bar{x} = [v_y \ v_x \ \mu_M]^t, \ \underline{A}(t) = \begin{bmatrix} 0 & -\dot{\Psi} & 0 \\ \dot{\Psi} & 0 & 0 \\ 0 & 0 & 0 \end{bmatrix}, \quad (114)$$

$$\bar{u}(t) = [y_2 \ y_3 \ 0] = [a_y \ a_x \ 0]^t$$

corresponds in a first embodiment to this general formulation.

The following representation of state space is thus obtained $$\begin{bmatrix} \dot{v}_y \\ \dot{v}_x \\ \dot{\mu} \end{bmatrix} = \begin{bmatrix} 0 & -\dot{\Psi} & 0 \\ \dot{\Psi} & 0 & 0 \\ 0 & 0 & 0 \end{bmatrix} \begin{bmatrix} + \\ v_y \mu \\ v_x \end{bmatrix} + \begin{bmatrix} y_2 \\ y_3 \\ 0 \end{bmatrix} \quad (115)$$

with the associated measurement equation $$\begin{bmatrix} y_1 \\ y_2 \end{bmatrix} = \begin{bmatrix} v_x \\ a_y(\bar{x}, \bar{u}) \end{bmatrix} \quad (116)$$

The determination of observer amplifiers is performed by methods derived from the prior art. In order to determine the so-called Luenberger observer, it is possible to proceed as set forth in the article by Bestle and Zeitz in the *International Journal of Control*, 1983, Volume 38, No. 2, pages 419 to 431. It is also possible to determine the observer amplification by means of a Kalman filter. Such a method is described in the book by Brammer/Siffling: "Kalman-Bucy-Filter" ("Kalman-Bucy Filters") in the series "Methoden der Regelungstechnik" ("Methods in Automatic Control Engineering") published by R. Oldenburg in Munich, Vienna dating from 1985. The expressions for the filter amplification determined by this method for the filter, and for the equations resulting therefrom, are reprinted below in Equations 1 and 2. In this case, E is the covariance matrix, O the matrix of the system disturbance, and R the noise. The corresponding values of the matrix elements of O and of R are to be determined experimentally. In particular, the noise is a function of the system composed of the sensor and evaluating electronics as well as the computing unit. Overall care must be taken to use diagonal, or at least symmetrical, matrices as far as possible.

The extension of the model represented below permits rolling movements of the vehicle to be taken into account by measuring the roll angle velocity. In this case, the measurement of the roll angle velocity is carried out, for example, with the aid of a rotational speed sensor having its measuring axis aligned in the vehicle longitudinal direction, which is also used to measure the yaw velocity.

The roadway inclination, that is to say the inclination angle, $\Phi$, is then introduced as an additional state variable. The lateral dynamics of the vehicle are then described by the following equation $$\dot{v}_y = -\dot{\Psi} v_x + \alpha_y \quad (117)$$

The vehicle lateral acceleration is composed in this case of two components. The first component comes about due to the tire forces and is described in equation (102). The second component arises from the influence of the rolling movement of the vehicle, having the roll angle $\phi$. If $a_{yr}$ is the component of the lateral acceleration based on the wheel forces, and g the acceleration due to gravity, the result is $$\alpha_y = \alpha_{yr} - g \cdot \sin \Phi \quad (118)$$

The lateral acceleration $a_{ym}$ measured in the vehicle is also, however, influenced by the rolling movement of the vehicle in addition to being influenced by the inclination $\Phi$ of the roadway. Taking account of the roll angle of the vehicle leads to the following relationship between the measured lateral acceleration and the lateral acceleration $$\alpha_y = \alpha_{ym} - g \cdot \sin(\phi + \Phi) \tag{119}$$

Linearising equations (118) and (119) and substituting them in one another yields $$\alpha_{ym} = \alpha_{yr} + g\phi \tag{120}$$

that is to say, in addition to the tire forces, an acceleration component is measured which is produced by the rolling in the vehicle. The roll angle can be represented to a good approximation by $$\phi = \phi_0 \frac{a_y}{g} \text{ with } \phi_0 \approx 8° \tag{121}$$

as a linear function of the lateral acceleration. In this case, $\phi_0$ is the roll angle which results under constant lateral acceleration $a_y = g$. The state model $$\frac{d}{dt} \begin{bmatrix} v_{y1} \\ v_{x1} \\ \mu_1 \\ e_1 \end{bmatrix} = \begin{bmatrix} 0 & -\dot\psi & 0 & 1 \\ \dot\psi & 0 & 0 & 0 \\ 0 & 0 & 0 & 0 \\ 0 & 0 & 0 & 0 \end{bmatrix} \begin{bmatrix} v_{y1} \\ v_{x1} \\ \mu_1 \\ e_1 \end{bmatrix} + \begin{bmatrix} \frac{a_{ym}}{1+\phi_0} \\ a_x \\ 0 \\ 0 \end{bmatrix} \tag{122}$$

with the measurement equations $$\begin{bmatrix} y_{11} \\ y_{21} \end{bmatrix} = \begin{bmatrix} v_{x1} \\ (1+\phi_0) \cdot a_{yr}(v_{y1}, v_{x1}, \mu_1, \delta, \omega_{rad}) + \phi_0 \cdot e_1 \end{bmatrix} \tag{123}$$

can be derived using the approximation according to equation (121). This model contains the state variables $v_{y1}, v_{x1}, \mu_1, e_1$, $\dot\Psi, a_{ym}, a_x, \delta, \omega_{rad}$ and the measurement equations for $v_x$ and $a_{ym}$.

The inclination error $e1 = -g\Phi$ is used as the new state. The wheel speeds $\omega_{ij}$, $i=v,h$ $j=l,r$ are combined as the vector $\omega_{rad}$. The index 1 stands as a mark of the model. The further model characterized by the index 2 takes account of the expression $ay = aym - g(\Phi + \phi)$ for the lateral acceleration. The inclination error $e_2$ is then given by $e_2 = -g(\Phi + \phi)$. Moreover, the roll velocity is measured. The equations of state $$\frac{d}{dt} \begin{bmatrix} v_{y2} \\ v_{x2} \\ \mu_2 \\ e_2 \end{bmatrix} = \begin{bmatrix} 0 & -\dot\psi & 0 & 1 \\ \dot\psi & 0 & 0 & 0 \\ 0 & 0 & 0 & 0 \\ 0 & 0 & 0 & 0 \end{bmatrix} \begin{bmatrix} v_{y2} \\ v_{x2} \\ \mu_2 \\ e_2 \end{bmatrix} + \begin{bmatrix} a_{ym} \\ a_x \\ 0 \\ -g\omega_x \end{bmatrix} \tag{124}$$

and the measurement equations $$\begin{bmatrix} y_{12} \\ y_{22} \end{bmatrix} = \begin{bmatrix} v_{x2} \\ (1+\phi_0) \cdot a_{yr}(v_{y1}, v_{x1}, \mu_1, \delta, \omega_{rad}) \end{bmatrix}. \tag{125}$$

are thus obtained for the further model.

This model takes account of the state vehicles $v_{y2}, v_{x2}, \mu_2, e_2$, the input variables $\dot\Psi, \omega_x, a_{ym}, a_x, \delta, \omega_{rad}$ and the measurement equations for $v_x$ and $a_{ym}$.

This design is based on a nonlinear system having the form $$\dot x = f(x,u) + w$$

$$y = h(x,y) + v \text{ with } x(0) = x_0 \tag{126}$$

In this case, the filters for the two models are $$\hat{\dot x} = f(x,u) + G[y - h(\hat x, u)]$$

$$G = PH^T R^{-1}$$

$$\dot P = FP + PF^\tau - PH^\tau R^{-1} HP + \underline{Q}' \tag{127}$$

$$P(0) = P_0$$

it being the case that $$F = \frac{\partial f(x,u)}{\partial x} \bigg|_{\hat x, u} \tag{128}$$

$$H = \frac{\partial h(x,u)}{\partial x} \bigg|_{\hat x, u}$$

holds, and $\underline{Q}$, $\underline{R}$ and $\underline{P}$ are the preferably symmetrical, covariance matrices of the system noise and measurement noise as well as of the estimate error. It was assumed when designing the filter amplifier that the system noise R is a diagonal matrix, that is to say that there is no correlation in the determination of the individual measured values.

Other objects, advantages and novel features of the present invention will become apparent from the following detailed description of the invention when considered in conjunction with the accompanying drawings.

BRIEF DESCRIPTION OF THE DRAWING

The sole FIGURE is a schematic block diagram of the present invention.

DETAILED DESCRIPTION OF THE DRAWING

The sole FIGURE shows an arrangement of sensors by which the measured variables on which the models are based are determined. A computing device 21 is fed signals 31, 32, 33, 34, 35, 36 which originate from sensors known per se, are conditioned if necessary in a manner known per se, and represent the given measured values. The computing device 21 can determine the vehicle velocity and output it as a signal 37. The side slip angle $\beta$ can be calculated from this signal in the computing device 22 and output as the signal 38.

Equation 1: Filter equation for the state model in accordance with equations (115) and (116).

$$\begin{bmatrix} \hat{\dot v}_y \\ \hat{\dot v}_x \\ \hat{\dot \mu}_H \\ \hat{\dot U} \\ \hat{\dot S} \end{bmatrix} = \begin{bmatrix} -\dot\psi \hat v_x + y_2 \\ \dot\psi \hat v_y + y_3 \\ 0 \\ K_U I(U_{stat}(\hat x_{E3}, u_{E3})) - \hat U) \\ K_S I(S_{stat}(\hat x_{E3}, u_{E3})) - \hat S) \end{bmatrix} + \begin{bmatrix} g_1^T \\ g_2^T \\ g_3^T \\ 0 \\ 0 \end{bmatrix} \cdot \begin{bmatrix} y_1 - \hat v_x \\ y_2 - a_y(U,S,\delta) \end{bmatrix}$$

Equation 2: Expression of the filter amplifier for the model in accordance with equations (115) and (116)

$$\dot P_{11} = -P_{21}^2/R_{11} + (-P_{31}^2 a_{y3}^2 - 2P_{21}P_{31}a_{y2}a_{y3} - 2P_{11}P_{31}a_{y1}a_{y3} -$$

$$P_{21}^2 a_{y2}^2 - 2P_{11}P_{21}a_{y1}a_{y2} - P_{11}^2 \alpha_{y1}^2)/R_{22} - 2P_{21}\dot\psi + Q_{11}$$

-continued $$\dot{P}_{21} = -P_{21}P_{22}/R_{11} + (-P_{31}P_{32}a_{y3}^2 - P_{21}P_{32}a_{y2}a_{y3} - P_{22}P_{31}a_{y2}a_{y3} - P_{11}P_{32}a_{y1}a_{y3} - P_{21}P_{31}a_{y1}a_{y3} - P_{21}P_{22}a_{y2}^2 - P_{11}P_{22}a_{y1}a_{y2} - P_{21}^2 a_{y1}a_{y2} - P_{11}P_{21}a_{y1}^2)/R_{22} - P_{22}\dot{\psi} + P_{11}\dot{\psi} + Q_{21}$$

$$\dot{P}_{22} = -P_{22}^2/R_{11} + (-P_{32}^2 a_{y3}^2 - 2P_{22}P_{32}a_{y2}a_{y3} - 2P_{21}P_{32}a_{y1}a_{y3} - P_{22}^2 a_{y2}^2 - 2P_{21}P_{22}a_{y1}a_{y2} - P_{21}^2 a_{y1}^2)/R_{22} + 2P_{21}\dot{\psi} + Q_{22}$$

$$\dot{P}_{31} = -P_{21}P_{32}/R_{11} + (-P_{31}P_{33}a_{y3}^2 - P_{21}P_{33}a_{y2}a_{y3} - P_{31}P_{32}a_{y2}a_{y3} - P_{11}P_{33}a_{y1}a_{y3} - P_{31}^2 a_{y1}a_{y3} - P_{21}P_{32}a_{y2}^2 - P_{11}P_{32}a_{y1}a_{y2} - P_{21}P_{31}a_{y1}a_{y2} - P_{11}P_{31}a_{y1}^2)/R_{22} - P_{32}\dot{\psi} + Q_{31}$$

$$\dot{P}_{32} = -P_{22}P_{32}/R_{11} + (-P_{32}P_{33}a_{y3}^2 - P_{22}P_{33}a_{y2}a_{y3} - P_{32}^2 a_{y2}a_{y3} - P_{21}P_{33}a_{y1}a_{y3} - P_{31}P_{32}a_{y1}a_{y3} - P_{22}P_{32}a_{y2}^2 - P_{21}P_{32}a_{y1}a_{y2} - P_{22}P_{31}a_{y1}a_{y2} - P_{21}P_{31}a_{y1}^2)/R_{22} + P_{31}\dot{\psi} + Q_{32}$$

$$\dot{P}_{33} = -P_{32}^2/R_{11} + (-P_{33}^2 a_{y3}^2 - 2P_{32}P_{33}a_{y2}a_{y3} - 2P_{31}P_{33}a_{y1}a_{y3} - P_{32}^2 a_{y2}^2 - 2P_{31}P_{32}a_{y1}a_{y2} - P_{31}^2 a_{y1}^2)/R_{22} + Q_{33}$$

$$\begin{bmatrix} g_1^T \\ g_2^T \\ g_3^T \end{bmatrix} = \begin{bmatrix} P_{21}/R_{11}, (P_{31}a_{y3}/R_{22} + P_{21}a_{y2}/R_{22} + P_{11}a_{y1}/R_{22}) \\ P_{22}/R_{11}, (P_{32}a_{y3}/R_{22} + P_{22}a_{y2}/R_{22} + P_{21}a_{y1}/R_{22}) \\ P_{32}/R_{11}, (P_{33}a_{y3}/R_{22} + P_{32}a_{y2}/R_{22} + P_{31}a_{y1}/R_{22}) \end{bmatrix}$$

using the abbreviation $$a_{yi} = \frac{\partial a_y(x_{E3}, u_{E3})}{\partial x_i}\bigg|_{\hat{x}_{i,u}}, i = 1(1)3$$

Expression of the filter amplification of the filter in accordance with equations (127) for the state model in accordance with equations:

(122), (123) for filter 1 and:

(124), (125) for filter 2.

$$\dot{\hat{v}}_{y1/2} = -\dot{\psi}\hat{v}_{x1/2} + \frac{a_{ym}}{1+\phi_1} + \frac{\hat{e}_{y1/2}}{1+\phi_1} + \frac{P_{21}}{R_{11}}[v_x - \hat{v}_{x1/2}] + \frac{(a_{y1}P_{11} + a_{y2}P_{21} + a_{y3}P_{31} + \phi_1 P_{41})}{R_{22}}[a_{ym} - ((1+\phi_0)\hat{a}_{yRK} + \phi_1 \hat{e}_{y1/2})]$$

$$\dot{\hat{v}}_{x1/2} = \dot{\psi}\hat{v}_{y1/2} + a_x + \frac{P_{22}}{R_{11}}[v_x - \hat{v}_{x1/2}] + \frac{(a_{y1}P_{21} + a_{y2}P_{22} + a_{y3}P_{32} + \phi_1 P_{42})}{R_{22}}[a_{ym} - ((1+\phi_0)\hat{a}_{yRK} + \phi_1 \hat{e}_{y1/2})]$$

$$\dot{\hat{\mu}}_{H1/2} = \frac{P_{32}}{R_{11}}[v_x - \hat{v}_{x1/2}] + \frac{(a_{y1}P_{31} + a_{y2}P_{32} + a_{y3}P_{33} + \phi_1 P_{43})}{R_{22}}[a_{ym} - ((1+\phi_0)\hat{a}_{yRK} + \phi_1 \hat{e}_{y1/2})]$$

$$\dot{\hat{e}}_{y1/2} = -g\omega_1 + \frac{P_{42}}{R_{11}}[v_x - \hat{v}_{x1/2}] + \frac{(a_{y1}P_{41} + a_{y2}P_{42} + a_{y3}P_{43} + \phi_1 P_{44})}{R_{22}}[a_{ym} - ((1+\phi_0)\hat{a}_{yRK} + \phi_1 \hat{e}_{y1/2})]$$

$$\dot{P}_{11} = -\frac{(a_{y1}P_{11} + a_{y2}P_{21} + a_{y3}P_{31} + \phi_1 P_{41})^2}{R_{22}} - \frac{P_{21}^2}{R_{11}} - 2P_{21}\dot{\psi} + \frac{2P_{41}}{1+\phi_1} + Q_{11}$$

$$\dot{P}_{21} = -\frac{(a_{y1}P_{11} + a_{y2}P_{21} + a_{y3}P_{31} + \phi_1 P_{41})(a_{y1}P_{21} + a_{y2}P_{22} + a_{y3}P_{32} + \phi_1 P_{42})}{R_{22}} - \frac{P_{22}P_{21}}{R_{11}} - P_{22}\dot{\psi} + P_{11}\dot{\psi} + \frac{P_{42}}{1+\phi_1} + Q_{21}$$

$$\dot{P}_{22} = -\frac{(a_{y1} \times P_{21} + a_{y2}P_{22} + a_{y3}P_{32} + \phi_1 P_{42})^2}{R_{22}} - \frac{P_{22}^2}{R_{11}} + 2P_{21}\dot{\psi} + Q_{22}$$

$$\dot{P}_{31} = -\frac{(a_{y1}P_{11} + a_{y2}P_{21} + a_{y3}P_{31} + \phi_1 P_{41})(a_{y1}P_{31} + a_{y2}P_{32} + a_{y3}P_{33} + \phi_1 P_{43})}{R_{22}} - \frac{P_{32}P_{21}}{R_{11}} - P_{32}\dot{\psi} + \frac{P_{43}}{1+\phi_1} + Q_{31}$$

$$\dot{P}_{32} = -\frac{(a_{y1}P_{21} + a_{72}P_{22} + a_{y3}P_{32} + \phi_1 P_{42})(a_{y1}P_{31} + a_{y2}P_{32} + a_{y3}P_{33} + \phi_1 P_{43})}{R_{22}} - \frac{P_{32}P_{22}}{R_{11}} + P_{31}\dot{\psi} + Q_{32}$$

$$\dot{P}_{33} = -\frac{(a_{y1}P_{31} + a_{y2}P_{32} + a_{y3}P_{33} + \phi_1 P_{43})^2}{R_{22}} - \frac{P_{32}^2}{R_{11}} + Q_{33}$$

$$\dot{P}_{41} = -\frac{(a_{y1}P_{11} + a_{y2}P_{21} + a_{y3}P_{31} + \phi_1 P_{41})(a_{y1}P_{41} + a_{y2}P_{42} + a_{y3}P_{43} + \phi_1 P_{44})}{R_{22}} - \frac{P_{42}P_{21}}{R_{11}} - P_{42}\dot{\psi} + \frac{P_{44}}{1+\phi_1} + Q_{41}$$

$$\dot{P}_{42} = -\frac{(a_{y1}P_{21} + a_{y2}P_{22} + a_{y3}P_{32} + \phi_1 P_{42})(a_{y1}P_{41} + a_{y2}P_{42} + a_{y3}P_{43} + \phi_1 P_{44})}{R_{22}} - \frac{P_{42}P_{22}}{R_{11}} + P_{41}\dot{\psi} + Q_{42}$$

$$\dot{P}_{43} = -\frac{(a_{y1}P_{31} + a_{y2}P_{32} + a_{y3}P_{33} + \phi_1 P_{43})(a_{y1}P_{41} + a_{y2}P_{42} + a_{y3}P_{43} + \phi_1 P_{44})}{R_{22}} - \frac{P_{42}P_{32}}{R_{11}} + Q_{43}$$

$$\dot{P}_{44} = -\frac{(a_{y1}P_{41} + a_{y2}P_{42} + a_{y3}P_{43} + \phi_1 P_{44})^2}{R_{22}} - \frac{P_{42}^2}{R_{11}} + Q_{44}$$

with the abbreviations $$\hat{a}_{yRK} = a_{yRK}(\hat{v}_{y1/2}, \hat{v}_{x1/2}, \hat{\mu}_{H1/2}, \delta, \omega_{Rad})$$

$$a_{y1} = (1 + \phi_0) \frac{\partial a_{yRK}(v_y, v_x, \mu H, \omega_{rad})}{\partial v_y} \bigg|_{\hat{v}_{y1/2}, \hat{v}_{x1/2}, \hat{\mu}_{H1/2}, \delta, \omega_{Rad}}$$

$$a_{y2} = (1 + \phi_0) \frac{\partial a_{yRK}(v_y, v_x, \mu_H, \delta, \omega_{Rad})}{\partial v_x} \bigg|_{\hat{v}_{y1/2}, \hat{v}_{x1/2}, \hat{\mu}_{H1/2}, \delta, \omega_{Rad}}$$

$$a_{y3} = (1 + \phi_0) \frac{\partial a_{yRK}(v_y, v_x, \mu_H, \delta, \omega_{Rad})}{\partial \mu_H} \bigg|_{\hat{v}_{y1/2}, \hat{v}_{x1/2}, \hat{\mu}_{H1/2}, \delta, \omega_{Rad}}$$

Using the above equations yields:
filter 1 for $\phi_1 = \phi_0$ and $\omega_1 = 0$, as well as
filter 2 for $\phi_1 = 0$ and $\omega_1 = \omega_x$.
The following is a glossary of the symbols used herein:

| Frequently occurring indices in the equations | |
|---|---|
| v — front | h — rear |
| l — left | r — right |
| s — lateral direction in the wheel system | |
| u — longitudinal direction in the wheel system | |
| x — vehicle longitudinal direction | |
| y — vehicle lateral direction | |
| z — vertical direction | |
| 1,2 — as mark for different models as designation for matrix elements | |

Indices that are possibly present are not always given in detail below.

| Vehicle variables | |
|---|---|
| l | wheelbase |
| $l_v$ | distance from vehicle center of gravity to front axle |
| $l_h$ | distance from vehicle center of gravity to rear axle |
| $s_{v,h}$ | track front, rear |
| $\omega_{rad}$ | vector of the wheel speeds |
| m | mass of the vehicle |
| $J_z$ | moment of inertia about the vertical axis |
| V | vehicle velocity |
| a | vehicle acceleration |
| $\delta$ | steering angle |
| $\psi$ | yaw of the vehicle |
| $\dot{\psi}$ | yaw velocity |
| $\ddot{\psi}$ | yaw acceleration |
| $\theta$ | pitch angle |
| $\phi$ | roll angle |

| Wheel/roadway system variables | |
|---|---|
| $S_{ij}$ | lateral forces on the wheel ij i = v, h j = l, r |
| $U_{ij}$ | longitudinal forces on the wheel ij i = v, h j = l, r |
| $C_u$ | resultant longitudinal stiffness of the tire and of the wheel suspension |
| $C_s$ | resultant slip stiffness |
| $C^*$ | standardized wheel stiffness |
| $\lambda$ | slip (with index in specific direction) |
| $\mu$ | adhesion coefficient (with index in specific direction) |
| $\xi$ | standardized slip |
| $\zeta$ | standardized characteristic over the standardized slip |
| $\Delta$ | disturbance |
| $\Phi$ | inclination angle of the roadway in the lateral direction |
| e | total inclination from roll angle and roadway inclination |

| Other variables used | |
|---|---|
| g | acceleration due to gravity |
| $\vec{a}$ | vector |

| | |
|---|---|
| $\underline{A}$ | matrix |
| $\vec{x}^t, \underline{A}^t$ | transposed vector or matrix |
| $\dot{x}, \ddot{x}, \dddot{x}$ | first, second time derivative of a variable, of a vector |
| $\vec{u}$ | input vector |
| $\vec{x}$ | state vector |
| $\vec{y}$ | output vector |
| f( ) | state function [of the variables given in ( )] |
| $\underline{G}$ | amplification (matrix) |
| $\underline{P}$ | covariance matrix of the estimated value |
| $\underline{Q}$ | covariance matrix of the system |
| $\underline{R}$ | covariance matrix of the measurement |

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A method for determining variables which represent handling characteristics of a vehicle having wheels, said method comprising the steps of:

feeding signals from the vehicle to a computing device, said signals representing measured values of a vehicle longitudinal velocity ($v_x$), a vehicle longitudinal acceleration ($a_x$), a vehicle lateral acceleration ($a_y$), and a vehicle yaw velocity ($\Psi$);

using state equations of motion in the computing device to determine said variables characterizing vehicle handling;

determining a side slip angle ($\beta$) in the computing device as one of said variables characterizing vehicle handling;

feeding at least further signals from the vehicle representing the measured variables of a steering angle ($\delta$), and a wheel speed ($\omega$) of individual ones of said wheels to the computing device;

using in the computing device at least one measurement equation based on a vehicle model;

using at least an inclination angle ($\Phi$) of a roadway with respect to a plane as a state variable in said measurement equation; and outputting signals from the computing device for said variables characterizing vehicle handling, including said side slip angle for the vehicle.

2. A method according to claim 1, wherein an expression for an adhesion coefficient ($\mu$) between a vehicle wheel and the roadway is used as a further state variable, and wherein the further state variable is used as an estimate for the adhesion coefficient ($\mu$) in said at least one measurement equation.

3. A method according to claim 2, wherein the adhesion coefficient ($\mu$) is quasistationary ($\dot{\mu}=0$).

4. A method according to claim 1, wherein said step of feeding signals to the computing device includes feeding the computing device with signals representing measured values of a vehicle yaw acceleration ($\ddot{\Psi}$) and a vehicle roll angle velocity.

5. A method according to claim 4, wherein as a further state equation of motion based on a vehicle model, a time derivative of an inclination error (e) forms the vehicle roll angle velocity.

6. A method according to claim 4, wherein the vehicle yaw acceleration is determined by measuring two lateral accelerations ($a_{y1}, a_{y2}$) by two sensors arranged spaced apart from each other in a vehicle longitudinal direction.

7. A method according to claim 1, further comprising the step of transforming the state equations of motion and the measurement equations into an observer standard form.

8. A method according to claim 7, wherein said transformation step determines an observer amplification using Kalman filtering.

9. A method according to claim 1, wherein the measurement equations are derived from a four-wheel model of the vehicle.

10. A system to determine variables representing handling characteristics of a vehicle having wheels, the system comprising:

- a vehicle longitudinal velocity sensor providing a vehicle longitudinal velocity output signal ($v_x$);
- a vehicle longitudinal acceleration sensor providing a vehicle longitudinal acceleration output signal ($a_x$);
- a vehicle lateral acceleration sensor providing a vehicle lateral acceleration output signal ($a_y$);
- a vehicle yaw velocity sensor providing a vehicle yaw velocity output signal ($\Psi$);
- a steering angle sensor providing a steering angle output signal ($\delta$);
- wheel speed sensors providing wheel speed output signals ($\omega$) for individual ones of said wheels of the vehicle;
- a computing device which receives as inputs said vehicle longitudinal velocity signal ($v_x$), said vehicle longitudinal acceleration signal ($a_x$), said vehicle lateral acceleration signal ($a_y$), said vehicle yaw velocity signal ($\Psi$), said steering angle signal ($\delta$), and said wheel speed signals ($\omega$), said computing device being programmed to perform the following steps:
  - determining said variables representing handling characteristics of the vehicle, including a side slip angle ($\beta$) as one of said variables, using state equations of motion and at least one measurement equation based on a vehicle model, wherein an inclination angle ($\Phi$) of a roadway with respect to a plane is used as a state variable in the measurement equation; and
- wherein said computing device outputs the side slip angle ($\beta$).

* * * * *